3,012,030
LOWER ALKYL ESTERS OF 1-CINNAMYL-3-METHYL-4-PHENYLPIPERIDINE-4-CARBOX-YLIC ACID
Paul A. J. Janssen, Antwerpse Steenweg 16', Vosselaar, near Turnhout, Belgium
No Drawing. Filed Apr. 29, 1960, Ser. No. 25,528
4 Claims. (Cl. 260—240)

The present invention relates to compounds expressed by the general formula

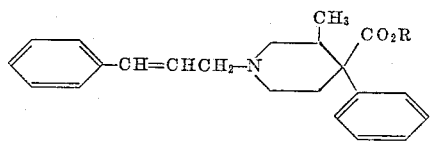

In this formula R can represent methyl, ethyl, straight or branched-chain propyl, butyl, amyl, and hexyl radicals. The cis-trans isomerism which arises at positions 3 and 4 results in the production of isomers in preparations involving these centers. For the sake of simplicity the lower melting isomer has been designated "α" and the higher melting "β." In the individual compound names this symbol has been included in the designation of the 3-methyl group. Experience in the art suggests that the "α" isomer is probably that in which the 3-methyl group is cis to the ester grouping at position 4 while the "β" isomer is of the opposite or trans configuration.

The compounds of this application can be prepared by a route which begins with tosylation of 2-hydroxyethyl-2-hydroxypropylamine; the tosylation product is converted to the corresponding dihalide, which is then condensed with phenylacetonitrile to give a 1-tosyl-3-methyl-4-cyano-4-phenylpiperidine. The nitrile is hydrolyzed, and the resultant acid is esterified. Removal of the tosyl moiety and subsequent alkylation gives the compounds of the invention.

These compounds are analgesic agents; the evidence suggests that the more potent species possess the "β" configuration. They also possess barbiturate potentiating and hyponotic activity, and are of special interest because of their low mydriatic activity.

The following examples are presented to further illustrate the invention; they should not be construed as limiting it in spirit or scope. Quantities of solids are given in parts by weight, and temperatures are in degrees centigrade (° C.).

*Example 1*

A mixture of 119 parts of 2-hydroxyethyl-2-hydroxypropylamine and 54 parts of sodium carbonate in 450 parts of water is heated to 70° C.; 190.5 parts of p-toluenesulfonyl chloride are added, and the resultant mixture is heated at 95° C. for one hour. At the end of this time the reaction mixture is cooled to 0° C. and filtered. The filter cake is extracted with ether, the ether is removed from the extracts, and the residue is taken up in isopropyl alcohol. Petroleum ether is added to the alcohol solution, and the resulting solution is chilled to —20° C. Two crops of crystals are collected, and can be used without further purification in the remainder of the procedure to follow. Purification can be effected by recrystallization from ethanol-acetone; the sample of N-(2-hydroxyethyl)-N-(2-hydroxypropyl)-p-toluenesulfonamide prepared in this way melts at 66.2–68.2° C.

A mixture of 450 parts of the dihydroxy amide in 690 parts of thionyl chloride is heated at 125° C. for one hour, and then cooled. The excess thionyl chloride is evaporated and the residue is taken up in 360 parts of dry toluene; the toluene solution is filtered and reduced in volume to yield N-(2-chloroethyl)-N-(2-chloropropyl)-p-toluenesulfonamide.

A solution of 400 parts of the dichloro amide and 152 parts of sodamide in toluene is heated to about 45° C.; 110 parts of phenylacetonitrile is added, in portions, and the resultant mixture is heated under reflux for 2 hours, then for 5–6 hours at room temperature. At the end of this time water is added, and the organic layer is removed and reduced in volume. The residue is treated with hot methanol; filtration of the resultant mixture and concentration of the filtrate gives 1-(4-methylbenzenesulfonyl)-3α-methyl-4-phenyl-4-cyanopiperidine; the purified sample melts at 143.5–146° C. The methanol-insoluble portion is recrystallized from butanol to give 1-(4-methylbenzenesulfonyl)-3β-methyl-4-phenyl-4-cyanopiperidine, melting at 217–218° C.

A mixture of 71.5 parts of the "β" isomer, 71.5 parts of potassium hydroxide, and 700 parts of ethylene glycol is heated at 170° C. for 9 hours and then poured into water. The resultant suspension is filtered and the filtrate is acidified with hydrochloric acid to precipitate 1-(4-methylbenzenesulfonyl) - 3β - methyl - 4 - phenylpiperidine-4-carboxylic acid. The purified sample melts at 209.5–211.4° C. Similar treatment of the "α" isomer provides 1-(4-methylbenzenesulfonyl)-3α-methyl-4-phenylpiperidine-4-carboxylic acid, melting at 173.4–175.8° C.

*Example 2*

A suspension of 20 parts of 1-(4-methylbenzenesulfonyl)-3β-methyl-4-phenylpiperidine-4-carboxylic acid in 225 parts of thionyl chloride is stirred until a clear solution is obtained. The excess thionyl chloride is removed, and the residue is dissolved in 160 parts of methanol. The methanol solution is stirred and heated under reflux overnight and then cooled to 0° C., to give methyl 1-(4-methylbenzenesulfonyl) - 3β - methyl - 4 - phenylpiperidine - 4-carboxylate, melting at 137.4–140.3° C. Analogous treatment of the "α" isomer provides methyl 1-(4-methylbenzenesulfonyl) - 3α - methyl - 4 - phenylpiperidine - 4 - carboxylate melting at 94.5–95.4° C.

*Example 3*

By the method of the preceding example, the acid chloride from 1-(4-methylbenzenesulfonyl)-3β-methyl-4-phenylpiperidine-4-carboxylic acid is treated with ethanol to give ethyl 1-(4-methylbenzenesulfonyl)-3β-methyl-4-phenylpiperidine-4-carboxylate, melting at 102–104.6° C. The "α" isomer, prepared similarly, melts at 127.8–128.2° C.

*Example 4*

A sample of 1-(4-methylbenzenesulfonyl)-3β-methyl-4-phenylpiperidine-4-carboxylic acid is converted to the acid chloride as described in Example 2 and this halide is condensed with isopropyl alcohol to yield isopropyl 1-(4-methylbenzenesulfonyl)-3β-methyl - 4 - phenylpiperidine-4-carboxylate, melting at 112.5–113.2° C. The "α" isomer is prepared similarly, and melts at 99–101.5° C.

*Example 5*

A mixture of 78 parts of methyl 1-(4-methylbenzenesulfonyl)-3β-methyl-4-phenylpiperidine-4-carboxylate, 59 parts of phenol and 500 parts of a saturated solution of hydrogen bromide in acetic acid is stirred at room temperature for about 20 hours. Ether is added, and the resultant solution is extracted with water. The water layer is made alkaline with sodium hydroxide, and the basic solution is extracted with ether. The ether solution is dried over magnesium sulfate and then concentrated. Distillation of the residue gives methyl 3β-methyl-4-phenylpiperidine-4-carboxylate which boils at 131–133°/0.4 mm. This compound forms a hydrochloride, which melts at 191–192.2° C. Methyl 3α-methyl-4-phenylpiperidine-4-carboxylate, prepared similarly, boils at 122–123°/0.02 mm.

Example 6

Application of the method of the preceding example to ethyl 1-(4-methylbenzenesulfonyl)-3β-methyl-4-phenylpiperidine-4-carboxylate yields ethyl 3β-methyl-4-phenylpiperidine-4-carboxylate, boiling at 126°/0.2 mm. This compound forms a hydrochloride, which melts at 175.6–176.2° C. Ethyl 3α-methyl-4-phenylpiperidine-4-carboxylate, similarly prepared, forms an oxalate which melts at 136.2–137.4° C.

Example 7

A sample of isopropyl 1-(4-methylbenzenesulfonyl)-3β-methyl-4-phenylpiperidine-4-carboxylate, treated by the procedure of Example 5, gives isopropyl 3β-methyl-4-phenylpiperidine-4-carboxylate, boiling at 124–126°/0.02 mm. Isopropyl 3α-methyl-4-phenylpiperidine-4-carboxylate, boiling at 136°/0.6 mm. is prepared similarly.

Example 8

A mixture of 3.3 parts of cinnamyl chloride, 4.6 parts of methyl 3β-methyl-4-phenylpiperidine-4-carboxylate, 6.5 parts of sodium carbonate, and a few crystals of potassium iodide in 80 parts of butanol is heated under reflux for 64 hours. The reaction mixture is filtered and the filtrate evaporated to dryness. The residue is taken up in diisopropyl ether, and hydrogen chloride gas is passed into the solution. The hydrochloride of methyl 1-cinnamyl-3β-methyl-4-phenylpiperidine-4-carboxylate is isolated by filtration, and recrystallized from acetone-isopropyl alcohol. The melting point is 193–194° C.

Example 9

The method of Example 8, on application to ethyl 3β-methyl-4-phenylpiperidine-4-carboxylate, yields the hydrochloride of ethyl 1-cinnamyl-3β-methyl-4-phenylpiperidine-4-carboxylate, melting at 205.5–206° C.

Example 10

Isopropyl 3β-methyl-4-phenylpiperidine-4-carboxylate undergoes alkylation and subsequent salt formation by the procedure of Example 8 to give the hydrochloride of isopropyl 1-cinnamyl-3β-methyl-4-phenylpiperidine-4-carboxylate, melting at 177.6–178.2° C.

What is claimed is:

1. A compound of the structural formula

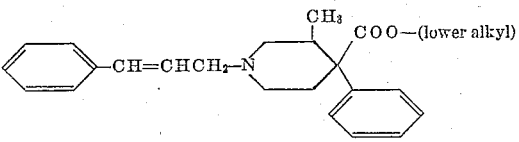

2. Methyl 1-cinnamyl-3β-methyl-4-phenylpiperidine-4-carboxylate.

3. Ethyl 1-cinnamyl-3β-methyl-4-phenylpiperidine-4-carboxylate.

4. Isopropyl 1-cinnamyl-3β-methyl-4-phenylpiperidine-4-carboxylate.

References Cited in the file of this patent

UNITED STATES PATENTS

| | | |
|---|---|---|
| 2,813,874 | Bruce et al. | Nov. 19, 1957 |
| 2,824,875 | Elpern | Feb. 25, 1958 |
| 2,858,316 | Morren | Oct. 28, 1958 |
| 2,880,211 | Elpern | Mar. 31, 1959 |
| 2,901,487 | Elpern | Aug. 25, 1959 |

FOREIGN PATENTS

| | | |
|---|---|---|
| 629,196 | Great Britain | Sept. 14, 1949 |